United States Patent [19]

Kohn

[11] Patent Number: 4,652,805

[45] Date of Patent: Mar. 24, 1987

[54] TACTILE FEEDBACK APPARATUS FOR ROTARY MANUAL INPUT

[75] Inventor: Gabriel S. Kohn, Bozeman, Mont.

[73] Assignee: Allen-Bradley Company, Inc., Milwaukee, Wis.

[21] Appl. No.: 794,432

[22] Filed: Nov. 4, 1985

[51] Int. Cl.$^4$ .............................................. G05B 11/01
[52] U.S. Cl. ................................... 318/628; 318/696; 335/275; 335/276
[58] Field of Search ....................... 318/628, 696, 685; 335/275, 276

[56] References Cited

U.S. PATENT DOCUMENTS 4,515,251  5/1985  Wruk ............................. 335/275 X
4,553,080  11/1985  Cannon et al. ....................... 318/696

FOREIGN PATENT DOCUMENTS 2016225  9/1979  United Kingdom ................ 318/685

Primary Examiner—William M. Shoop, Jr.
Assistant Examiner—Saul M. Bergmann
Attorney, Agent, or Firm—Barry E. Sammons

[57] ABSTRACT

An apparatus for rotary manual input utilizes an electromagnetic brake and control circuit to provide tactile feedback to the operator similar to that of a mechanical detent. A shaft connects a handwheel to the brake and to an incremental encoder. The torque generated by the brake when energized is small enough to allow easy rotation of the handwheel. The control circuit keeps the brake normally energized. As the handwheel is turned, the control circuit monitors the encoder position signals and momentarily de-energizes the brake for each incremental movement. The momentary loss of resistance is felt by the operator to verify the incremental movement. The encoder position signals are also made available to an external device, such as for example a Numerical Controller, to implement the commanded movement.

5 Claims, 4 Drawing Figures

TO EXTERNAL
DEVICE

TACTILE FEEDBACK APPARATUS FOR ROTARY MANUAL INPUT

BACKGROUND OF THE INVENTION

The field of the invention is rotary manual input mechanisms and more particularly, tactile feedback apparatuses used thereon.

There are numerous applications where a knob or crank is manually turned to carry out a control function. In a numerically controlled machine tool, for example, a handwheel may be provided on the control panel to enable the operator to manually "jog" the cutting tool along one or more axes of motion. The amount of handwheel rotation is translated into a digital quantity by a position transducer and is then employed to drive the appropriate servomechanism the desired distance. In such applications, it is essential to provide tactile feedback to the operator so that each time an incremental movement is made, the operator can feel it on the handwheel. The prevailing practice in prior control systems is to employ a detent mechanism to provide the needed tactile feedback. Each detent then corresponds to one incremental movement, for example 0.001 inch of jog, and the operator can feel a click from the detent for each such incremental movement. While detent mechanisms are generally satisfactory, they are mechanically complex and are subject to wear, requiring maintenance for lubrication and adjustment.

To eliminate the need for mechanical detents, other methods of providing tactile feedback have been developed. For example, a stepping motor can be used as the position transducer as described in U.S. Pat. No. 4,553,080 by the assignee of the present invention, wherein the static torque of the stepping motor provides tactile feedback. This approach too is satisfactory, but requires additional components to overcome a basic limitation, which is the possibility of missing pulses when the stepping motor is rotated too slowly. Also, a somewhat complex control circuit is required to convert the signals from the stepping motor into a form suitable for use by an external device.

SUMMARY OF THE INVENTION

The pulse generator of the present invention eliminates the need for a mechanical detent mechanism by instead utilizing a small electromagnetic brake and control circuit to provide the requisite operator feel. A handwheel shaft with a handwheel on one end is connected to the rotor of the electromagnetic brake. When the electromagnetic brake is energized, as is normally the case, a limited resistance to shaft rotation is provided which is small enough to be overcome by manual rotation of the handwheel. The other end of the handwheel shaft is coupled to the input shaft of a position transducer. The transducer generates signals indicative of the incremental position and direction of the transducer input shaft rotation. An electromagnetic brake driving circuit keeps the brake normally energized and monitors the transducer signals. When the transducer signals indicate that the shaft has been rotated one incremental position, the driving circuit momentarily de-energizes the electromagnetic brake thus providing tactile feedback to the operator similar to that of a mechanical detent.

A general object of the invention is to provide a tactile feedback apparatus which is mechanically simple, reliable, and which does not require periodic maintenance.

The foregoing and other objects and advantages of the invention will appear from the following description. In the description reference is made to the accompanying drawings which form a part hereof and in which there is shown a preferred embodiment of the invention. Such embodiment does not necessarily represent the full scope of the invention, however, and reference is made to the claims herein for interpreting the breadth of the invention.

DESCRIPTION OF THE PREFERRED EMBODIMENT

Figure 1:
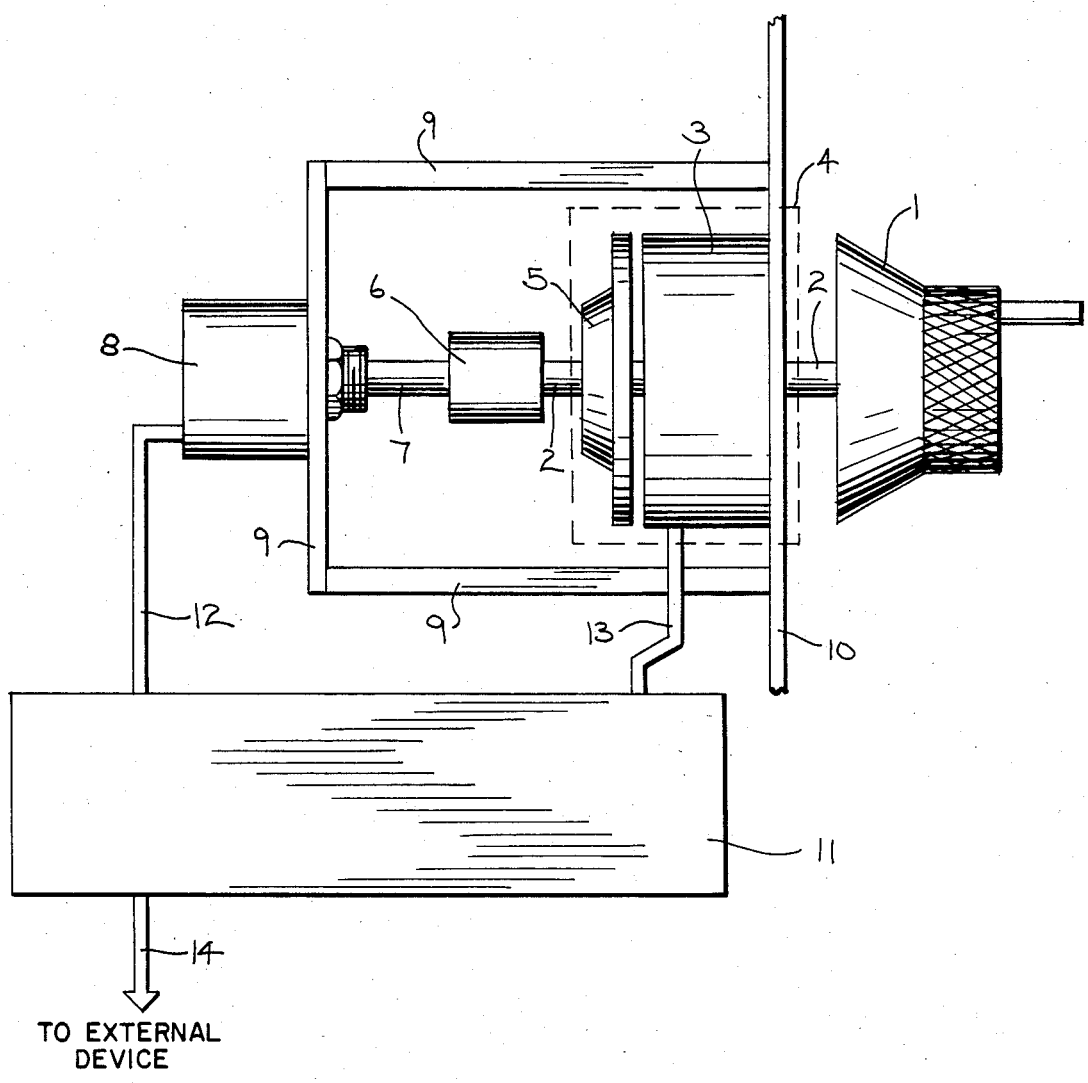
FIG. 1 is a plan view of the tactile feedback apparatus of the present invention.

Referring to FIG. 1, a handwheel 1 is mounted on one end of a handwheel shaft 2. The handwheel shaft extends through the stationary coil 3 of an electromagnetic brake assembly shown in dashed line 4. The electromagnetic brake assembly 4 is a commercially available device such as Model No. BF-20 available from Deltran, a division of American Precision. The rotor 5 of the electromagnetic brake 4 is fixed onto the handwheel shaft 2. A flexible coupling 6 on the other end of the handwheel shaft 2 connects the handwheel shaft 2 to the input shaft 7 of an incremental encoder 8. The encoder 8 is a commercially available device such as Model No. HEDS-7500 available from Hewlett-Packard and it is supported and held in a fixed position by structural members 9 attached to a front panel 10.

A control circuit 11 connects to the encoder 8 via an encoder cable 12, to the stationary coil 3 of the electromagnetic brake 4 via a brake cable 13, and to an external device (not shown) via an external cable 14. The external device (not shown) is some type of machine controller such as, for example, a Numerical Controller (NC) for which the handwheel 1 is to be used.

The tactile feedback apparatus for rotary manual input of the present invention provides the operator with tactile feedback similar to that of a mechanical detent action without the disadvantages of such a mechanism. The control circuit 11 keeps the electromagnetic brake 4 normally energized. In the energized state, the brake 4 generates a torque of approximately 10 inch-ounces, which is easily overcome by manual rotation of the handwheel 1 and provides for a smooth slipping motion.

Figure 3A:
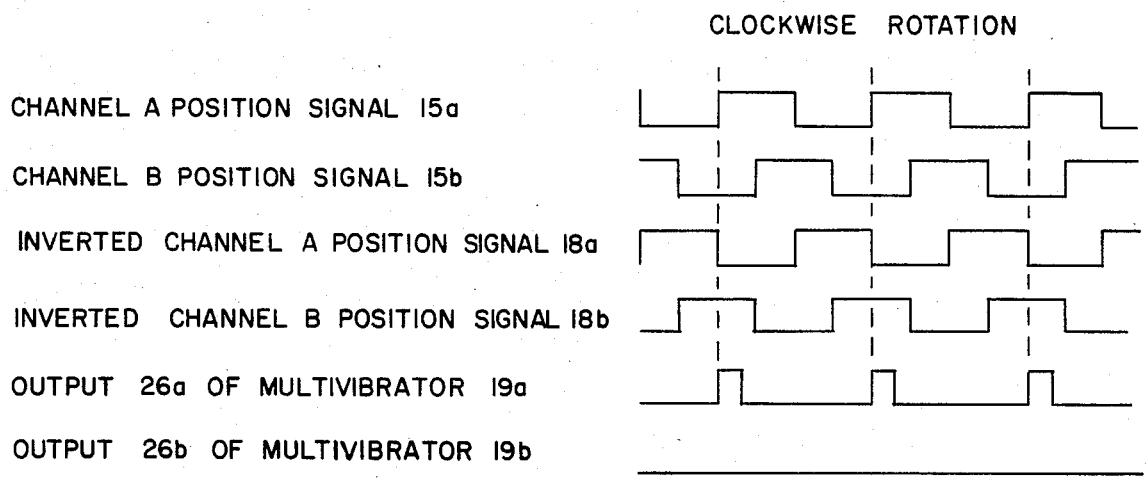
FIG. 3a is a timing diagram for clockwise rotation of the encoder input shaft of the tactile feedback apparatus of FIG. 1.
Figure 3B:
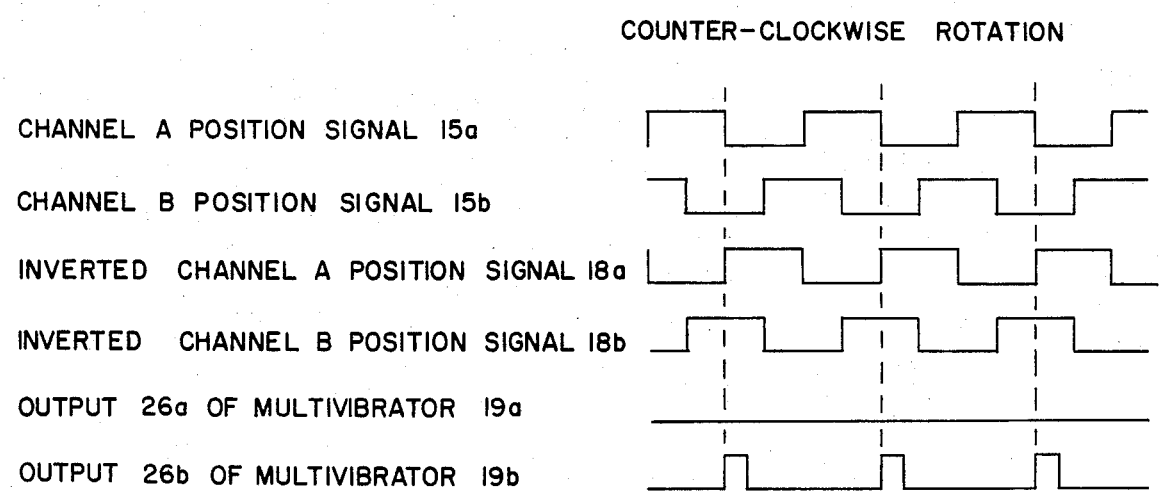
FIG. 3b is a timing diagram for counter-clockwise rotation of the encoder input shaft of the tactile feedback apparatus of FIG. 1.

Referring to FIGS. 1, 3a and 3b, as the handwheel 1 is turned, the encoder 8 generates incremental position signals 15a and 15b. The control circuit 11 monitors the incremental position signals 15a and 15b and de-energizes the brake 4 for approximately 10 milliseconds every time the incremental position signal 15a completes an electrical cycle. This momentary loss of friction is felt by the operator thus providing the requisite tactile feedback.

Figure 2:
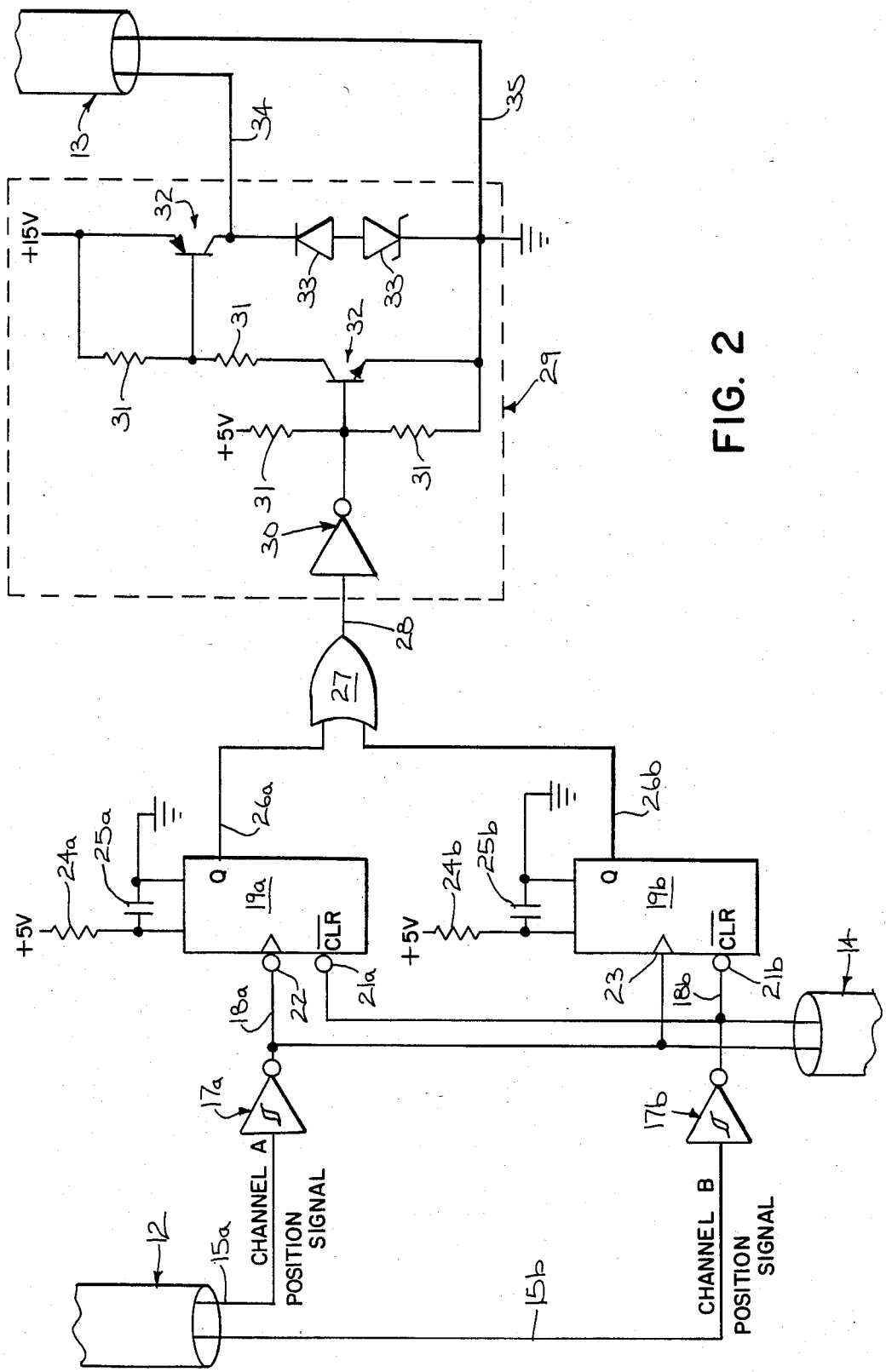
FIG. 2 is a schematic diagram of the control circuit for the tactile feedback apparatus of FIG. 1.

Referring now to FIG. 2, the encoder cable 12 carries encoder position signals 15a and 15b for channel A 15a and channel B 15b, respectively. The position signals 15a and 15b are logic levels which are 90 degrees out of phase with respect to each other (i.e. in quadrature). These position signals 15a and 15b are applied to Schmitt triggered inverters 17a and 17b, respectively, which buffers and shapes the position signals 15a and 15b. After the inverters 17a and 17b, the inverted position signals 18a and 18b are available for connection to the external device (not shown) and are connected to a pair of one shot multivibrators 19a and 19b. Because of the quadrature relationship of the inverted position signals 18a and 18b, the external device is able to ascertain in well known fashion both the direction of movement and the number of incremental positions moved.

The one shot multivibrators 19a and 19b decode the inverted position signals 18a and 18b to generate a pulse for each incremental position of movement in either direction. The inverted channel B position signal 18b is applied to the inverted clear (CLR) inputs 21a and 21b of both multivibrators 19a and 19b. The inverted channel A position signal 18a is applied to the negative edge clock input 22 of multivibrator 19a and to the positive edge clock input 23 of multivibrator 19b. Thus, the multivibrators 19a and 19b are enabled only when the channel B position signal 15b is low (inverted channel B position signal 18b high). Then, multivibrators 19a and 19b respond to the negative edge and positive edges for clockwise and counterclockwise motion respectively, of the inverted channel A position signal 18a.

Referring primarily to FIG. 3a, for clockwise rotation the inverted channel A position signal 18a goes from high to low while channel B position signal 15b is low, and multivibrator 19a is triggered. Similarly, referring to FIG. 3b, for counterclockwise rotation the inverted channel A position signal 18a goes from low to high while the channel B position signal 15b is low, and one shot multivibrator 19b is triggered.

Referring back now to FIG. 2, resistors 24a and 24b and capacitors 25a and 25b are timing elements for the multivibrators 19a and 19b, respectively, with values selected to yield a pulse of 10 milliseconds. The outputs 26a and 26b of the two multivibrators 19a and 19b, respectively, are combined in "or" gate 27, thus insuring a pulse at the same point in an incremental period and in either direction. The output 28 of "or" gate 27 is applied to a drive circuit, shown in dashed line 29, for the electromagnetic brake 4. The drive circuit 29 includes an inverter 30 to keep the brake 4 normally energized and a coil driving amplifier made up of resistors 31, transistors 32, and diodes 33 connected in well known fashion. The drive circuit output 34 together with a ground connection 35 are connected to the stationary coil 3 through the brake cable 13.

It should be apparent to one skilled in the art that the tactile feedback apparatus of the present invention could easily be adapted for use with a wide variety of position transducers other than the incremental encoder 8 described in this embodiment. For example, an absolute encoder (not shown) (i.e. one that indicates absolute position rather than relative incremental position) could be used with modification to the control circuit 11 to detect a change in the least significant bit of the absolute position to pulse the brake 4 off. Similarly, other types of position transducers could be used with attendant adaptations of the control circuit 11.

I claim:

1. A tactile feedback apparatus for rotary manual input which comprises:
   a handwheel rigidly mounted on a rotatably supported handwheel shaft;
   an electromechanical brake attached to the handwheel shaft and being operable when energized to urge a pair of frictional surfaces together to provide a limited resistance to shaft rotation, said resistance being small enough to be overcome by manual rotation of the handwheel;
   a position transducer mounted in a fixed position and having an input shaft coupled to the handwheel shaft, said transducer being operable to generate position signals indicative of the incremental rotation of the transducer input shaft; and
   a control circuit coupled to receive the transducer position signals and produce a drive signal to the electromagnetic brake, said control circuit including:
      a detector circuit coupled to receive the transducer position signals and being operable to produce an output signal each time the transducer input shaft is rotated one increment; and
      an electromagnetic brake dirving circuit coupled to receive the detector circuit output signald and being operable to produce the drive signal which keeps the electromagnetic brake normally energized and momentarily de-energizes the electromagnetic brake for each occurrence of the detector circuit output signal.

2. The tactile feedback apparatus as recited in claim 1 in which the position transducer is an incremental encoder.

3. The tactile feedback apparatus as recited in claim 2 in which position signals from the incremental encoder include two logic signals in quadrature.

4. The tactile feedback apparatus as recited in claim 1 in which the duration of the detector output signal is approximately 10 milliseconds.

5. The tactile feedback apparatus as recited in claim 1 in which the detector circuit includes at least one astable multivibrator device.

* * * * *